(12) United States Patent (10) Patent No.: US 11,005,887 B2
Shin et al. (45) Date of Patent: May 11, 2021

(54) HONEYNET METHOD, SYSTEM AND COMPUTER PROGRAM FOR MITIGATING LINK FLOODING ATTACKS OF SOFTWARE DEFINED NETWORK

(71) Applicant: Korea Advanced Institute of Science and Technology, Daejeon (KR)

(72) Inventors: Seungwon Shin, Daejeon (KR); Jinwoo Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 167 days.

(21) Appl. No.: 16/159,297

(22) Filed: Oct. 12, 2018

(65) Prior Publication Data
US 2019/0132360 A1 May 2, 2019

(30) Foreign Application Priority Data

Nov. 2, 2017 (KR) .......................... 10-2017-0145362
Apr. 24, 2018 (KR) .......................... 10-2018-0047077

(51) Int. Cl.
*G06F 21/56* (2013.01)
*G06F 21/14* (2013.01)
(Continued)

(52) U.S. Cl.
CPC .......... *H04L 63/1491* (2013.01); *H04L 45/64* (2013.01); *H04L 63/0236* (2013.01);
(Continued)

(58) Field of Classification Search
None
See application file for complete search history.

(56) References Cited

U.S. PATENT DOCUMENTS 6,646,989 B1 * 11/2003 Khotimsky ............. H04L 45/12
370/238
9,021,092 B2 * 4/2015 Silva ................... H04L 63/1425
709/224
(Continued)

FOREIGN PATENT DOCUMENTS

KR 1020170090161 A 8/2017
KR 1020170109949 A 10/2017

OTHER PUBLICATIONS

Deploying Virtual Honeypots on Virtual Machine Monitor. Zakaria et al. IEEE. (Year: 2008).*
(Continued)

*Primary Examiner* — Venkat Perungavoor
(74) *Attorney, Agent, or Firm* — Cozen O'Connor

(57) ABSTRACT

The present invention which relates to HoneyNet method, system, and computer program for mitigating link flooding attacks by exposing Honey Topology in SDN (Software Defined Networking) includes a Honey Node detecting unit configured to detect Honey Node Set of static metric and dynamic metric calculating from a SDN controller and OF (OpenFlow), a Honey Topology generating unit configured to arrange Honey Topology by applying probability model for the Honey Node Set, and an access determining unit configured to detect packet-in triggered to a Honey Node, and control transmission of packet to the Honey Topology from the Honey Node.

9 Claims, 6 Drawing Sheets

(51) Int. Cl.
  H04L 29/06 (2006.01)
  H04L 12/715 (2013.01)
  G06F 21/62 (2013.01)
(52) U.S. Cl.
  CPC ...... H04L 63/1408 (2013.01); H04L 63/1416 (2013.01); H04L 63/1458 (2013.01); *H04L 63/10* (2013.01)

(56) References Cited

U.S. PATENT DOCUMENTS

| | | | | |
|---|---|---|---|---|
| 9,350,751 | B2* | 5/2016 | Silva | H04L 63/1491 |
| 9,756,075 | B1* | 9/2017 | Gopalakrishna | H04L 63/1491 |
| 9,794,279 | B2* | 10/2017 | DiValentin | H04L 63/1433 |
| 2005/0125195 | A1* | 6/2005 | Brendel | H04L 63/1408 |
| | | | | 702/182 |
| 2007/0237153 | A1* | 10/2007 | Slaughter | H04L 45/28 |
| | | | | 370/392 |
| 2010/0138925 | A1* | 6/2010 | Barai | H04L 63/1433 |
| | | | | 726/25 |
| 2014/0115706 | A1* | 4/2014 | Silva | H04L 63/1491 |
| | | | | 726/23 |
| 2016/0269434 | A1* | 9/2016 | DiValentin | H04L 63/1408 |
| 2017/0093911 | A1* | 3/2017 | Robertson | H04L 61/2007 |
| 2017/0318053 | A1* | 11/2017 | Singh | H04L 63/1425 |
| 2018/0115470 | A1* | 4/2018 | Huang | H04L 41/0873 |
| 2019/0068642 | A1* | 2/2019 | Araujo | G06F 21/567 |
| 2019/0207976 | A1* | 7/2019 | Yadav | H04L 63/1491 |
| 2020/0389487 | A1* | 12/2020 | Zhauniarovich | H04L 63/1416 |
| 2021/0051175 | A1* | 2/2021 | Lyle | H04L 61/6022 |

OTHER PUBLICATIONS

HoneYDSPK: Cisco onePK implementation for Anomaly-based IDS and Honeypot services. Trandafir et al. (Year: 2016).*
Improving Deception in Honeypot. Alese et al. IEEE. (Year: 2014).*
Towards Simulating a Virtual Distributed Honeypot at KFUPM: A Case Study. Sqalli et al. IEEE. (Year: 2010).*
Software-Defined HoneyNet: Towards Mitigating Link Flooding Attacks. Kim et al. IEEE. (Year: 2017).*
Deceiving Network Reconnaissance Using SDN-Based Virtual Topologies. Acleitner et al. IEEE. (Year: 2017).*
SDN Virtual Honeynet for Network Attack Information Acquisition. Lian et al. SMCE. (Year: 2017).*
Provos, N., "A Virtual Honeypot Framework," 13th USENIX Security Symposium, Feb. 20, 2018, retrieved from https:/twww.usenix.org/legacy/publications/library/proceedlngs/sec04/tech/full_papers/provos/provos_html/lndex.html, 25 pages.

* cited by examiner

HONEYNET METHOD, SYSTEM AND COMPUTER PROGRAM FOR MITIGATING LINK FLOODING ATTACKS OF SOFTWARE DEFINED NETWORK

Korean Patent Application No. 10-2018-0047077, filed on Apr. 24, 2018, in the Korean Intellectual Property Office, is incorporated herein by reference.

BACKGROUND

1. Field of the Invention

The following example embodiments relate to a HoneyNet method, system, and computer program for mitigating link flooding attacks of software defined network, more particularly, a technology for exposing Honey Topology in Software Defined Network.

2. Description of the Related Art

As smartphone penetration has increased, data usage has increased geometrically. Also, as the use of IOT (Internet of Things) receiving attention as future industry increases, this trend is predicted to further increase. According to this trend, a stable network should be supported in order to use data smoothly. However, the current network is formed with very complicated structures, and to manage it, it leads to high cost. Furthermore, there is a disadvantage that it is vulnerable to various malicious attacks such as DDoS attacks on government agencies, personal information leakage in financial institutions, nuclear power plant hacking attempts, and the like.

To improve this problem, SDN (Software Defined Network) has appeared. Unlike the existing network equipment, the SDN is divided in network control plane and data plane, and may integrate and manage network. Also, the SDN may simplify network structure, maximize network usage efficiency through data decentralized processing, prevent and follow up various malicious attacks by using a SDN controller. However, the SDN still have security vulnerabilities.

For example, LFA (Link Flooding Attack) is DDoS attack which may not be identified and detected, and consumes bandwidth of bottleneck link. While DDoS attack generally targets to end node, LFA targets to middle link.

Also, LFA may form a broad area completely separated from the outside of network, and an attacker may acquire layer-3 link where the flow is collected by adjusting network topology through traceroute. Here, the attacker may instruct a bot to send low-speed traffic which is similar to positive traffic to bottleneck link during maintaining proper session by using a server which is publicly accessible. Accordingly, there is a limit that the existing countermeasure such as detecting spoofed IP addresses or specific signatures may not block LFA.

To overcome this limit, several studies have been published to detect and mitigate LFA in both of the existing network and SDN network.

However, the existing study results are only follow-up countermeasures. In other words, a system which is proposed in the existing studies responses after LFA actually occurs.

A fundamental reason for an attacker to perform LFA is that a link map may be created including a series of IP addresses for an intermediate router or a final host through traceroute. Accordingly, the attacker may start to attack or change a target link by using the link map when finding vulnerable target link set.

In other words, the system which is proposed in the existing studies is only blocking simply traceroute in order to defend LFA. Therefore, effective mitigation method for LFA is required.

SUMMARY

At least one example of embodiments may provide a technology for mitigating link flooding attacks by exposing Honey Topology to an attacker in Software Defined Network.

Also, at least one example of embodiments may provide a technology for mitigating link flooding attacks through a method for hiding actual topology from attacker's view.

According to at least one example of embodiments, a HoneyNet system for exposing Honey Topology in SDN (Software Defined Networking) may include a Honey Node detecting unit configured to detect Honey Node Set of static metric and dynamic metric calculating from a SDN controller and OF (OpenFlow), a Honey Topology generating unit configured to arrange Honey Topology by applying probability model for the Honey Node Set, and an access determining unit configured to detect packet-in triggered to a Honey Node, and control transmission of packet to the Honey Topology from the Honey Node.

The Honey Node detecting unit may include a static metric calculating unit configured to acquire potential bottleneck link by calculating the static metric due to BC (Betweenness Centrality) of network topology from the SDN controller, a dynamic metric calculating unit configured to calculate the dynamic metric which is CBR (Consumed Bandwidth Rate) of each link by collecting port statistics of the OF, a minimum cross set acquiring unit configured to acquire minimum cross set of the static metric and the dynamic metric, and a set selecting unit configured to select the Honey Node Set through the minimum cross set.

The static metric calculating unit may calculate static metric of the BC by using route path acquired by policy-based routing and route determined by SDN application.

The minimum cross set acquiring unit may acquire dynamic metric average aggregated to destination of a link by adding up the calculated dynamic metric of each vertex, and dividing the added up dynamic metric into the number of edges for each vertex.

The minimum cross set acquiring unit may arrange each of values of the static metric and dynamic metric averages in order, and acquires the minimum cross set from the highest value.

The Honey Topology generating unit may generate the Honey Topology which is scale-free networks by using random graph algorithm.

The Honey Topology generating unit may arrange the generated Honey Topology to node degree by using the probability model of power-law distribution.

The access determining unit may control transmission of packet to the Honey Topology from a Hub Node when detecting packet-in triggered to the Honey Node connected to the Hub Node, and selects the nearest node in the Honey Node as a final response node.

According to another aspect of at least one example of embodiments, a HoneyNet method for exposing Honey Topology in SDN (Software Defined Networking) may include detecting Honey Node Set of static metric and dynamic metric calculated by a SDN controller and OF (OpenFlow), arranging Honey Topology by applying probability model for the Honey Node Set, and detecting packet-in triggered to a Honey Node, and transmitting packet to the Honey Topology from the Honey Node.

The detecting Honey Node Set may include acquiring potential bottleneck link by calculating the static metric due to BC (betweenness Centrality) of network topology from the SDN controller, calculating the dynamic metric which is CBR (Consumed Bandwidth Rate) of each link by collecting port statistics of the OF, acquiring minimum cross set of the static metric and the dynamic metric, and selecting the Honey Node Set through the minimum cross set.

According to another aspect of at least one example of embodiments, a computer program stored in computer readable medium in order that a computer performs a process for exposing Honey Topology in SDN (Software Defined Networking) may perform a function of detecting Honey Node Set of static metric and dynamic metric calculated by a SDN controller and OF (OpenFlow), a function of arranging Honey Topology by applying probability model for the Honey Node Set, and a function of detecting packet-in triggered to a Honey Node and transmitting packet to the Honey Topology from the Honey Node.

According to example embodiments, link flooding attacks may be mitigated through a method for hiding actual topology from attacker's view by exposing Honey Topology to the attacker in Software Defined Network.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
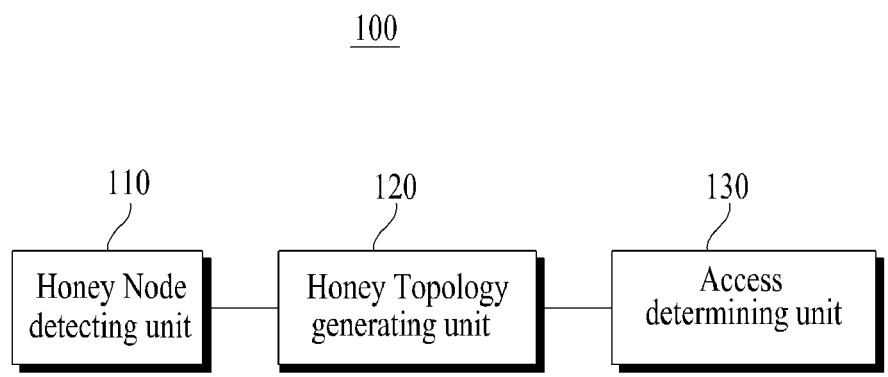
FIG. 1 is a drawing for describing a configuration of HoneyNet system according to an example of embodiments.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Also, terminologies used herein refer to terms used to appropriately represent the example embodiments and may vary based on a reader, the intent of an operator, or custom of a field to which this disclosure belongs, and the like. Accordingly, the definition of the terms should be made based on the overall description of the present specification.

A configuration of general Software Defined Network will be described before describing a HoneyNet method, system, and computer program of the present invention.

SDN (Software Defined Network) may include a SDN controller (or controller server), network equipment, and host, the network equipment and host may be referred to node, and Link may mean a connection of two nodes.

The controller server which manages the network equipment manages and controls a plurality of network equipment in centralized. Particularly, the controller server may be implemented with a form where software functioning Topology management, Path management, Link discovery, Flow management, and the like is loaded in modular.

The network equipment may perform a function of processing packet according to control of the controller server. Examples of network equipment include mobile communication base station, base station controller, gateway equipment, wired network switch, router, and the like. However, hereinafter, for the convenience of description, it will focus on the case where the network equipment is OpenFlow switch. Here, the OpenFlow switch may be understood as a concept including a switch supporting only OpenFlow protocol, a virtual switch supporting OpenFlow protocol, a general L2 switch supporting OpenFlow protocol, but the controller server may control with a switch supporting Netconf protocol as well as the switch supporting OpenFlow protocol. Therefore, the present invention is not limited by types of protocol used in information exchange between the controller server and the switch in Software Defined Network.

More particularly, the OpenFlow switch exchanges information with the controller server through Control Channel. The Control Channel is a communication channel between OpenFlow switch and the controller server located at a distance, and information exchanged between the controller server and the OpenFlow switch may be encrypted. Also, the OpenFlow switch may have at least one or more Flow Tables defining and processing packet, and including statistical information relating to packet. The Flow Table may be configured with Flow Rule defining packet process, and the Flow Rule may be generated by the controller server, and added, modified, or deleted by Flow-Mod Message transmitted to the OpenFlow switch.

The OpenFlow switch processes packet by referring to the Flow Table. The Flow Table may include Match Field for packet defining flow, Instruction defining packet process, and Stats for each flow. Here, each row forming the Flow Table may be referred to as Flow Entry, and Priority may be specified to each Flow Entry. The switch may process packet according to operation information of the Flow Entry indicating the highest priority among Flow Entries including Match Field corresponding to packet information.

The host which means a terminal corresponding to lower layer of the OpenFlow switch may be used as a mean of a collective name for client and server. The host may generate packet for transmitting to another host through Software Defined Network, and transmit the packet to the OpenFlow switch through network interface port.

In other words, in the above-described SDN (Software Defined Networking), HoneyNet method, system, and computer program are proposed for exposing Honey Topology.

The present invention may migrates link flooding attacks more fundamentally than a system proposed in the existing studies by hiding actual topology from attacker's view and exposing Honey Topology. The present invention refers to traditional honeypot imitating decoy servers or systems in order to attract attackers.

First of all, the present invention should acquire which link an attacker targets in order to locate Honey Topology at a reasonable position. In general network, network operator depended on out-of-band instrument to search whole network topology. Also, because residual link bandwidth is important component for whether link may be easily flooded, the network operator calculated link bandwidth through end-to-end measurement test.

Because of these reasons, the present invention may use Global Network Visibility which is one of advantages of Software Defined Networking. For example, the present invention may provide a function of searching topology in bandwidth for the whole network through a SDN controller, and monitor link statistics in real-time through OF (OpenFlow) which is an actual standard protocol. Also, both of static metric and dynamic metric are considered to correctly acquire potential bottleneck link. Here, while the static metric may be, for example, routing path which may hardly be changed, the dynamic metric may be, for example, a used bandwidth which may be fast changed.

A HoneyNet system, method, and computer program will be described hereinafter referring to FIGS. 1 to 6 according to an example of embodiments.

Figure 2:
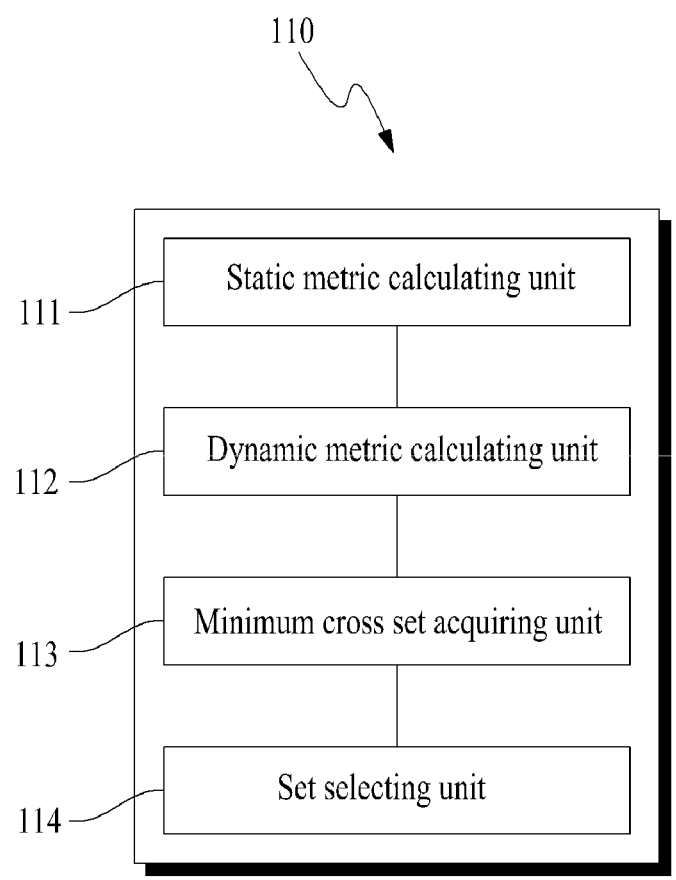
FIG. 2 is a drawing for describing a detailed configuration of Honey Node detecting unit according to an example of embodiments.

FIG. 1 is a drawing for describing a configuration of HoneyNet system according to an example of embodiments, and FIG. 2 is a drawing for describing a detailed configuration of Honey Node detecting unit according to an example of embodiments.

Referring to FIG. 1, a HoneyNet system locates and exposes Honey Topology by detecting Honey Node Set in SDN (Software Defined Networking).

For this, a HoneyNet system 100 includes a Honey Node detecting unit 110, a Honey Topology generating unit 120, and an access determining unit 130.

The Honey Node detecting unit 110 detects Honey Node Set of static metric and dynamic metric calculated by a SDN controller and OF (OpenFlow). More particularly, the Honey Node detecting unit 110 may calculate static metric of network topology by the SDN controller, calculate dynamic metric of link by collecting port statistics of the OF, and detect Honey Node Set through minimum cross set of static metric and dynamic metric.

Hereinafter, referring to FIG. 2, the detailed configuration of the Honey Node detecting unit will be described in detail.

Referring to FIG. 2, the Honey Node detecting unit 110 may include a static metric calculating unit 111, a dynamic metric calculating unit 112, a minimum cross set acquiring unit 113, and a set selecting unit 114.

The static metric calculating unit 111 may acquire potential bottleneck link from the SDN controller by calculating static metric by BC (Betweenness Centrality) and DC (Degree Centrality) of network topology.

The BC gives a high score to a node where routing pass goes through a lot, and the DC gives a high score according to the number of edges of the node. Accordingly, the static metric calculating unit 111 may add more weight to the BC rather than DC.

As an example, the static metric calculating unit 111 may acquire Hub Node Set $V_{hub}$ preferentially having potential target link in network topology, and calculate BC of vertex v through the below Equation 1. Here, AS-level routing path may be determined by policy-based routing.

$$C_B(v) = \sum_{s \neq t \neq v \in V} \frac{path_{st}(v)}{path_{st}}$$ Equation 1

Here, $path_{st}(v)$ indicates a route determined by an SDN application.

As another example, the static metric calculating unit 111 may calculate DC of vertex v through the below Equation 2.

$$C_D(v) = deg(v)$$ Equation 2

Here, deg(v) indicates degree for node v, i.e., the number of edges.

In other words, the static metric calculating unit 111 which calculates static metric of BC and DC by using routing path acquired by policy-based routing and route determined by an SDN application may reduce time complexity by calculating all routing path pairs by using algorithm of Brandes.

The dynamic metric calculating unit 112 may calculate dynamic metric which is CBR (consumed Bandwidth Rate) of each link by collecting port statistics of.

The dynamic metric calculating unit 112 may collect port statistics, and calculate dynamic metric from three kinds of messages of Port Statistics, Queue Statistics, and Flow Statistics. Here, the dynamic metric calculating unit 112 may apply weight for each of statistics in the order of Port Statistics, Queue Statistics, and Flow Statistics.

Furthermore, the HoneyNet system 100 may select a port having the highest adding up value as a vulnerable port when adding up statistics for each port of switch.

Port Statists may be used as basic information of dynamic metric calculation, and provide statistics (e.g., RX, TX packet, byte count, and the like) for each port of switch. According to an example of embodiments, there are Received Packets, Transmitted Packets, Received Bytes, Transmitted Bytes, and the like.

OpenFlow switch may set Queue for each port in order to provide QoS (Quality of Service), and manage rate of packet, and Queue statistics may indicate statistics for Queue for each port. According to an example of embodiments, there are Transmit Packets, Transmitted Bytes, and the like.

Flow Statistics may provide statistics (e.g., packet, byte count, and the like) for Flow Rule installed on Flow Table. According to an example of embodiments, there are Received Packets, Received Bytes, and the like. Also, the HoneyNet system 100 may gasp traffic by referring to in-port and output-port among matching information of Flow Rule based on Flow Statistics.

Hereinafter, dynamic metric calculation which is CBR of each link will be described.

The dynamic metric calculating unit 112 may use port statistics of (OpenFlow), collect TX byte for all ports of each switch for all Intervals, and calculate use rate of link. Here, TX bytes of source vertex s is regarded as accumulated transmitted bytes for link e(s, t). Also, Interval means a certain period that a SDN controller receives port statistics from all switches.

Furthermore, the dynamic metric calculating unit 112 may calculate CBR (Consumed Bandwidth Rate) which is dynamic metric of link e(s, t) through below Equation 3.

$$CBR(e(s, t)) = \frac{\frac{PreviousTXBytes(s) - CurrentTXBytes(s)}{Interval} \times 1.25 \times 10^9}{MaxBandwidth(e(s, t))}$$ Equation 3

Here, PreviousTXBytes(s) indicates a value for TX byte of vertex s collected from the previous request, and CurrentTXBytes(s) indicates a value for TX byte of vertex s collected from the current request.

Accordingly, the dynamic metric calculating unit 112 may calculate CBR which is dynamic metric of link e(s, t) after converting to bits per second by using the value for TX byte of vertex s collected from the previous request and the value for TX byte of vertex s collected from the current request, and then dividing to MaxBandwidth(e(s, t)).

The minimum cross set acquiring unit 113 converts the calculated CBR(e(s, t)) to aggregated average CBR (AACBR) for destination vertex t of the link e(s, t). Here, high AACBR value for vertex t may indicate that node uses a lot of incoming edges.

For example, the minimum cross set acquiring unit 113 adds up the calculated dynamic metric of each vertex v ∈ V, divide the added up dynamic metric with the number of edges including vertex v, and by acquiring the aggregated dynamic metric average for destination of the link, AACBR set of the dynamic metric average and BC set of the static metric may be constructed.

Then, the minimum cross set acquiring unit 113 may arrange each set in descending order based on the values of AACBR set of the dynamic metric average and BC set of the static metric, and acquire a minimum cross set between AACBR set of the dynamic metric average and BC set of the static metric from the highest value. Here, the value of vertex indicating high grade in AACBR set of the dynamic metric average and BC set of the static metric may be set $V_{hub}$.

In other words, the minimum cross set acquiring unit 113 calculates metric according to the dynamic metric and the static metric, and by acquiring cross set thereon, tries to acquire link set (or Honey Node Set) to be targeted.

The set selecting unit 114 may select Honey Node Set through the minimum cross set. Furthermore, the set selecting unit 114 may acquire $V_{honey}$ which is a set of vertex indicating lower BC than $V_{hub}$ as well as adjacency of $V_{hub}$. Here, the set collecting unit 114 may prevent malignant traffic from directly reaching to bottleneck link by selecting adjacent point of Hub Node.

Referring back to FIG. 1, the Honey Topology generating unit 120 of the HoneyNet system 100 arranges Honey Topology on node degree based on probability model according to Honey Node Set. The Honey Node Topology generating unit 120 may arrange Honey Node Topology generated on node degree following power-law distribution which is probability model.

For example, the Honey Topology generating unit 120 may use Barabsi-Alberta (BA) model which is random graph algorithm generating scale-free networks in order to complicatedly form Honey Topology. The BA model which is algorithm based on probability model determining connection probability of node may be configured with two simple steps of a first step and a second step.

As an example of embodiments, in the first step, the BA model may insert a new node having m edge in the existing graph, and then, in the second step, perform preferential attachment attaching edge with probability of degree expressed with $$p_i = \frac{k_i}{\sum k_j}$$

in the inserted node i. Here, $k_i$ means degree of node i.

Here, the HoneyNet system 100 features to construct and distribute Honey Topology with software switch because arranging hardware switch is time consuming and hard to be implemented when considering practical problems such as cabling, switch configuration, and high cost. The protocol type of the HoneyNet system 100 may be implemented on ONOS (Open Network Operating System) controller with SDN application (Java code 2,000 lines).

The access determining unit 130 may detect packet-in triggered to Honey Node, and transmit packet from Honey Node to Honey Topology.

Generally, a final host does not transmit packet where TTL value is 1 in IP network. By using this, the HoneyNet system 100 regards a host transmitting packet where TTL value is 1 as scout performing traceroute. Accordingly, the access determining unit 130 may control to transmit packet from Honey Node to Honey Topology when packet-in triggered by packet is detected from one of Honey Node. Here, it is premised that a distance from Honey Node to all nodes of Honey Topology is calculated. Accordingly, the access determining unit 130 may select the nearest node from Honey Node as a final response node in order that an attacker is forced to completely visit Honey Topology.

Figure 3:
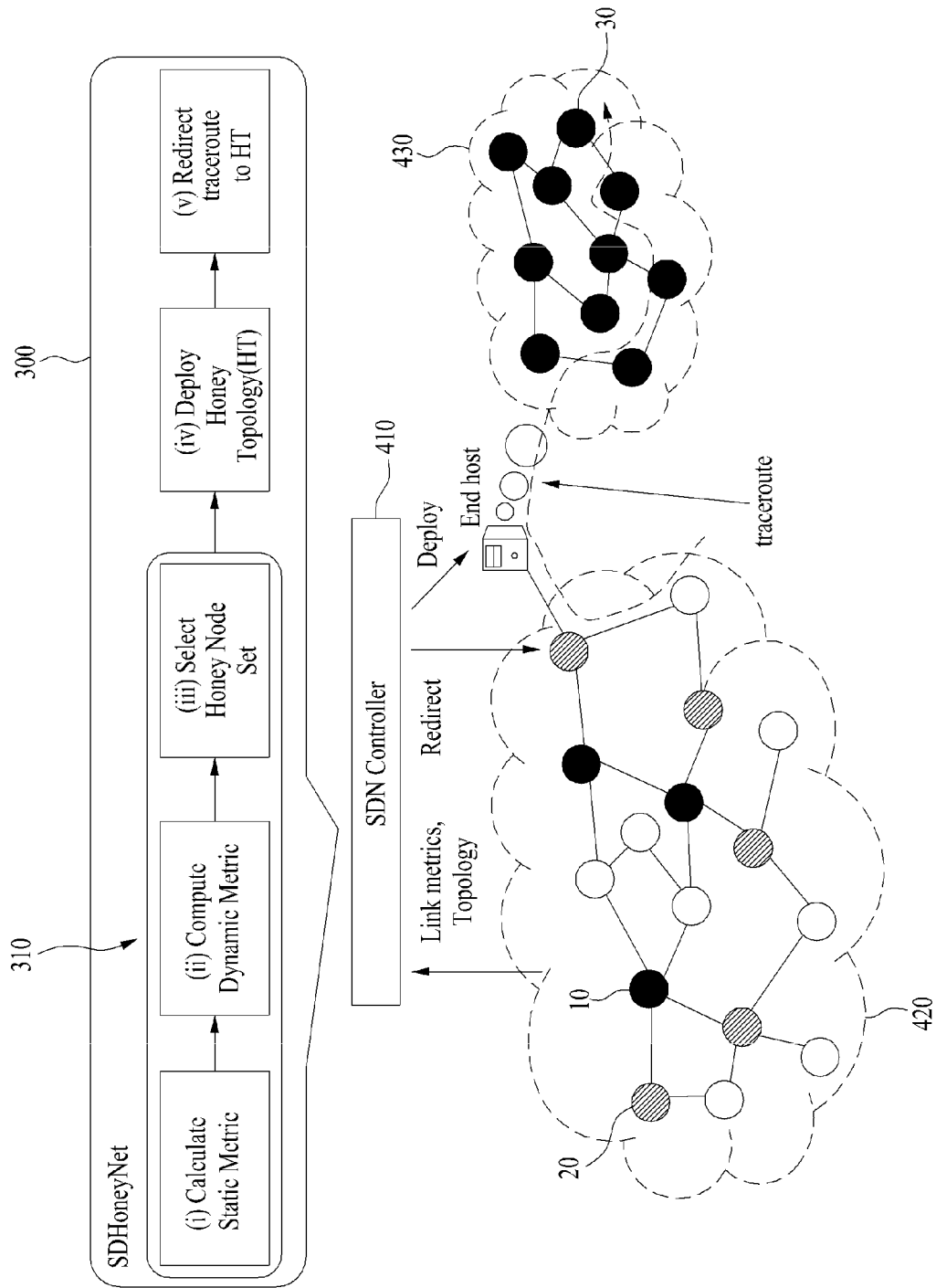
FIG. 3 illustrates an overall workflow of HoneyNet system according to an example of embodiments.

FIG. 3 illustrates an overall workflow of HoneyNet system according to an example of embodiments.

A HoneyNet system 300 distributes Honey Topology 430 to a final host of Honey Node after acquiring Honey Node Set 20. Here, Honey Node is vertex having calculated static metric value and dynamic metric value. Also, Honey Node is a neighbor of Hub Node, and may be vertex having lower BC (Betweenness Centrality) than Hub Node to hide link vulnerable to reconnaissance of attacker.

Referring to FIG. 3, the HoneyNet system 300 calculates static metric of network topology by a SDN controller 410, calculates dynamic metric of link by collecting port statistics of (OpenFlow), and includes configuration of a Honey Node detecting unit 310 detecting Honey Node Set 10 through a minimum cross set of the static metric and the dynamic metric. Afterwards, the HoneyNet system 300 distributes Honey Topology, and redirects traceroute to HT.

Infrastructure Topology 420 including Hub Node Set $V_{hub}$ 10 and Honey Node Set $V_{honey}$ 20 may redirect with the SDN controller 410, Link metrics, and topology. Also, the Honey Topology 430 includes OVS Node Set 30 generated by BA model and may be distributed from the HoneyNet system 300 through the SDN controller 410.

Figure 4:
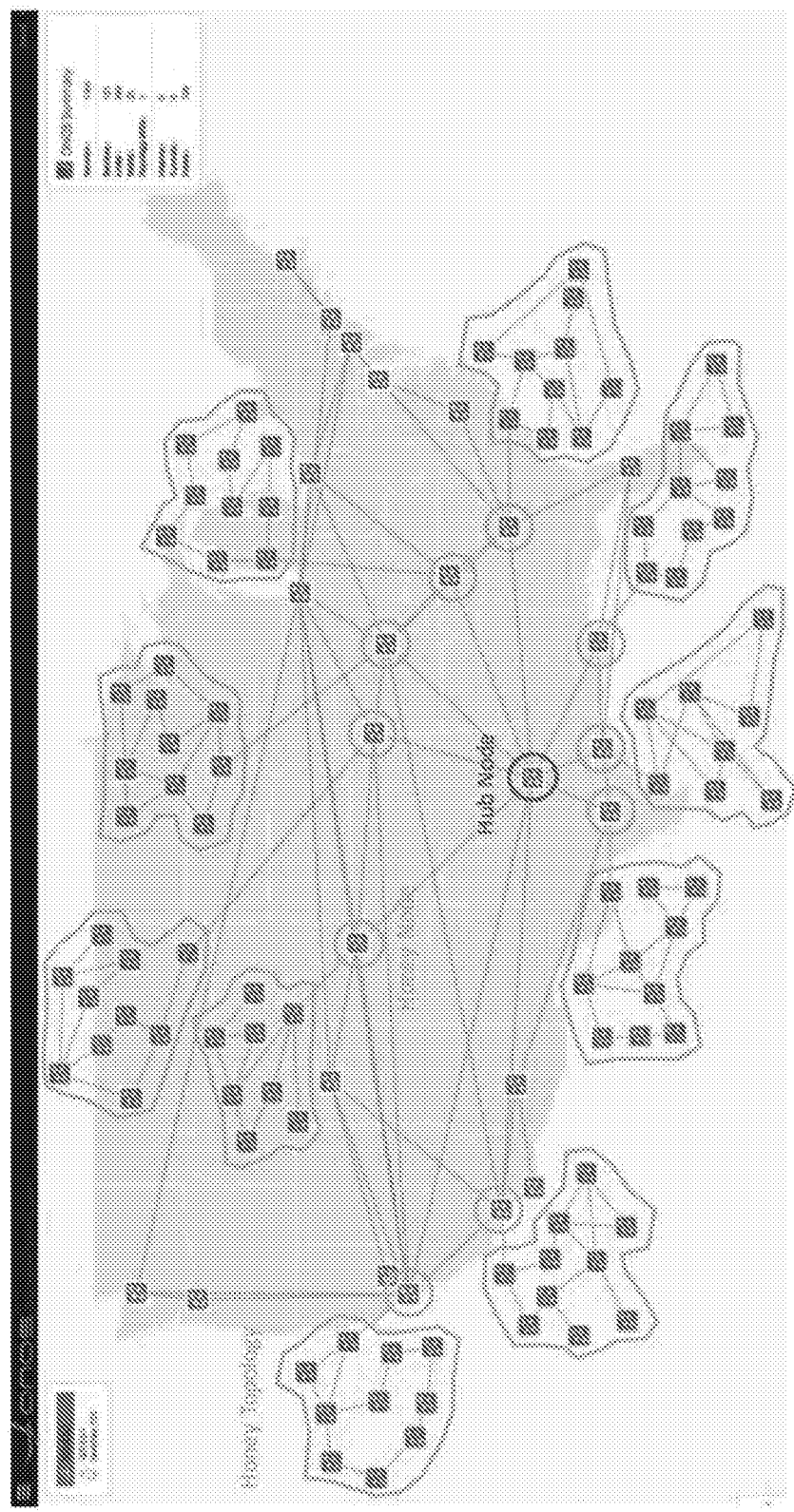
FIG. 4 illustrates a result for Honey Topology distribution according to an example of embodiments.

FIG. 4 illustrates a result for Honey Topology distribution according to an example of embodiments.

Evaluation is performed by a machine where Intel Core i5-6600K @3.50 GHz and 16 GB RAM is installed, and uses ONOS 1.6.0 and Mininet emulating network by using OVS v2.3. As experiment topology, large networks where node degree follows power-law distribution are considered. Also, AT&T North America topology which is OC-48 optical fiber network is emulated, and 25 ISP level router is configured from Internet Topologyzoo.

FIG. 4 illustrates snapshot of ONOS GUI indicating a result acquiring all of Hub Node and Honey Node, and it may identify Honey Topology arranged on Honey Node. Here, red switch indicates OVS in Honey Topology generated by BA model, and distribution time is less 10 seconds when the number of switches distributed in performance test is fifty.

In other words, the HoneyNet system may mitigate link flooding attacks through a method for hiding actual topology from attacker's view by exposing Honey Topology to the attacker in SDN (Software Defined Network) environment.

Figure 5:
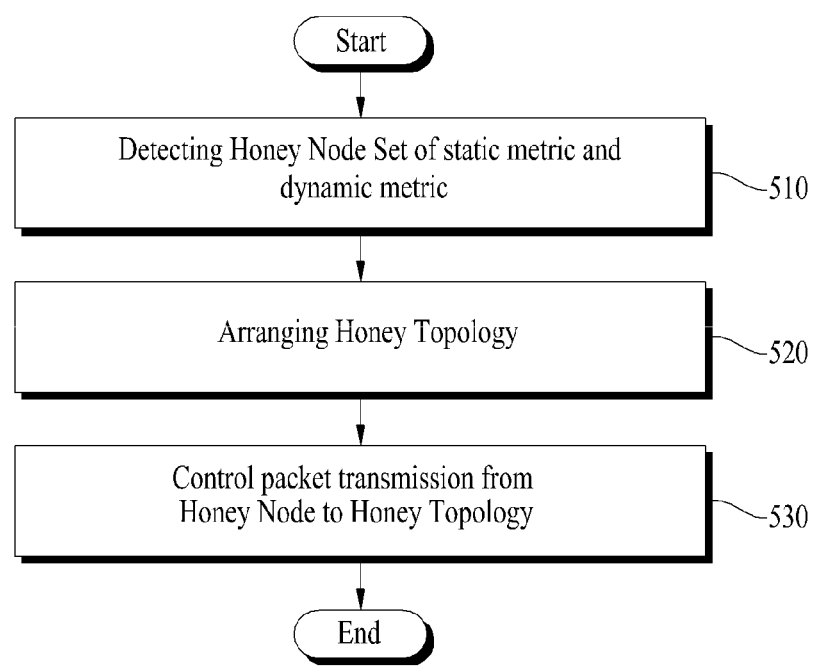
FIG. 5 is a flow chart illustrating a HoneyNet method according to an example of embodiments.
Figure 6:
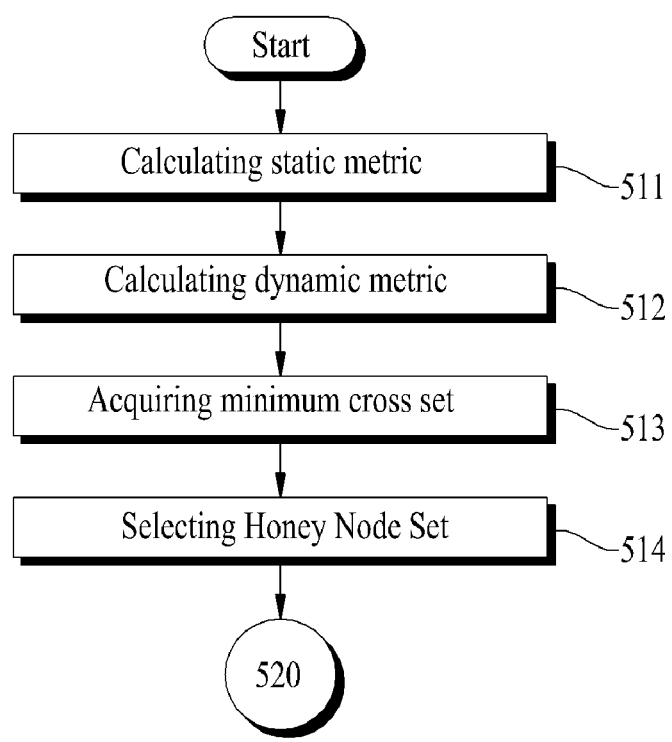
FIG. 6 is a flow chart illustrating detecting Honey Node Set according to an example of embodiments.

FIG. 5 is a flow chart illustrating a HoneyNet method according to an example of embodiments, and FIG. 6 is a flow chart illustrating detecting Honey Node Set according to an example of embodiments.

The HoneyNet method illustrated in FIG. 5 is performed by the HoneyNet system illustrated in FIG. 1 according to an example of embodiments, and the detecting Honey Node Set illustrated in FIG. 6 is performed by the Honey Node detecting unit illustrated in FIG. 2 according to an example of embodiments.

In Step 510, Honey Node Set of static metric and dynamic metric calculated by a SDN controller and OF (OpenFlow) is detected.

Hereinafter, Step 510 will be described in detail by referring to FIG. 6.

Referring to FIG. 6, in Step 511, potential bottleneck link may be acquired by calculating static metric due to BC (Betweenness Centrality) and DC (Degree Centrality) of network topology from the SDN controller.

The BC gives a high score to a node where routing passes go through a lot, and the DC gives a high score according to the number of edges of the node. Accordingly, Step 511 may add more weight to the BC than the DC.

Step 511 may preferentially calculate BC (Betweenness Centrality) of vertex v through Equation 1 by acquiring Hub Node Set $V_{hub}$ having potential target link in network topology, and calculate DC (Degree Centrality) through Equation 2. Here, AS-level routing path may be determined by policy-based routing.

In step 512, dynamic metric which is CBR (Consumed Bandwidth Rate) of each link may be calculated by collecting port statistics of OF.

Step 512 collects port statistics of OF, and may calculate dynamic metric from three kinds of messages such as Port Statistics, Queue Statistics, and Flow Statistics, and here, weight for each statistics may be applied in order of Port Statistics, Queue Statistics, and Flow Statistics.

As described about dynamic metric which is CBR of each link, Step 512 may be a step for collecting TX bytes for all ports of each switch by using port statistics of OF (OpenFlow) for all Interval, and calculating use rate. Here, TX bytes of source vertex s are regarded as accumulated transmission bytes. Also, interval means a certain period receiving port statistics by the SDN controller from all switches. Furthermore, in Step 512, CBR which is dynamic metric of link e(s, t) may be calculated by Equation 3.

In Step 513, a minimum cross set including a node having high static metric and dynamic metric may be acquired. For example, Step 513 may be a step constructing average AACBR set of dynamic metric and BC set of static metric by adding up dynamic metric calculated from each vertex v ∈ V, dividing the added up dynamic metric by the number of edges including vertex v, and acquiring the aggregated dynamic metric average for destination of link.

In Step 514, Honey Node Set may be selected through the minimum cross set.

Referring back to FIG. 5, in Step 520, Honey Topology is arranged on node degree based on probability mode according to Honey Node Set. Step 520 may be a step arranging Honey Topology generated on node degree following power-law distribution which is probability mode.

In Step 530, packet-in triggered to Honey Node is detected, and packet is transmitted to Honey Topology from Honey Node.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

DESCRIPTION OF REFERENCES 100, 300: HoneyNet System
310: Honey Node detecting unit
410: SDN controller
420: Infrastructure Topology
430: Honey Topology
10: Hub Node Set
20: Honey Node Set
30: OVS Node Set

What is claimed is:

1. A HoneyNet system for exposing Honey Topology in SDN (Software Defined Networking) comprising:
    a Honey Node detector configured to detect a Honey Node Set of static metric and dynamic metric calculated from an SDN controller and OF (OpenFlow), the static metric being calculated via the SDN controller and the dynamic metric being calculated via OF;
    a Honey Topology generator configured to arrange a Honey Topology by applying a probability model for the Honey Node Set; and
    an access determiner configured to detect a packet-in triggered to a Honey Node, and control transmission of the packet to the Honey Topology from the Honey Node;
    wherein the Honey Node detector comprises:
        a static metric calculator configured to acquire potential bottleneck links by calculating the static metric due to BC (Betweenness Centrality) of network topology from the SDN controller;
        a dynamic metric calculator configured to calculate the dynamic metric which is a CBR (Consumed Bandwidth Rate) of each link by collecting port statistics of the OF;
        a minimum cross set acquirer configured to acquire a minimum cross set of the static metric and the dynamic metric; and
        a set selector configured to select the Honey Node Set through the minimum cross set.

2. The HoneyNet system of claim 1, wherein the static metric calculator calculates static metric of the BC by using route path acquired by policy-based routing and route determined by SDN application.

3. The HoneyNet system of claim 1, wherein the minimum cross set acquirer acquires dynamic metric average aggregated to destination of a link by adding up the calculated dynamic metric of each vertex, and dividing the added up dynamic metric into the number of edges for each vertex.

4. The HoneyNet system of claim 3, wherein the minimum cross set acquirer arranges each of values of the static metric and dynamic metric averages in order, and acquires the minimum cross set from the highest value.

5. The HoneyNet system of claim 1, wherein the Honey Topology generator generates the Honey Topology which is scale-free networks by using random graph algorithm.

6. The HoneyNet system of claim 5, wherein the Honey Topology generator arranges the generated Honey Topology to node degree by using the probability model of power-law distribution.

7. The HoneyNet system of claim 1, wherein the access determiner controls transmission of packet to the Honey Topology from a Hub Node when detecting the packet-in triggered to the Honey Node connected to the Hub Node, and selects the nearest node in the Honey Node as a final response node.

8. A HoneyNet method for exposing Honey Topology in SDN (Software Defined Networking) comprising:
    detecting a Honey Node Set of static metric and dynamic metric calculated by an SDN controller and OF (OpenFlow), the static metric being calculated via the SDN controller and the dynamic metric being calculated via OF;
    arranging a Honey Topology by applying a probability model for the Honey Node Set; and
    detecting a packet-in triggered to a Honey Node, and transmitting the packet to the Honey Topology from the Honey Node;
    wherein detecting the Honey Node Set comprises:
        acquiring potential bottleneck links by calculating the static metric due to BC (betweenness Centrality) of network topology from the SDN controller;
        calculating the dynamic metric which is CBR (Consumed Bandwidth Rate) of each link by collecting port statistics of the OF;
        acquiring a minimum cross set of the static metric and the dynamic metric; and
        selecting the Honey Node Set through the minimum cross set.

9. A non-transitory computer readable medium that stores processor-executable instructions that, when executed by a processor, causes a computer to perform a process for exposing Honey Topology in SDN (Software Defined Networking) by:
    detecting a Honey Node Set of static metric and dynamic metric calculated by an SDN controller and OF (OpenFlow), the static metric being calculated via the SDN controller and the dynamic metric being calculated via OF;
    arranging the Honey Topology by applying a probability model for the Honey Node Set; and
    detecting a packet-in triggered to a Honey Node and transmitting the packet to the Honey Topology from the Honey Node;
    wherein detecting the Honey Node Set comprises:
        acquiring potential bottleneck links by calculating the static metric due to BC (betweenness Centrality) of network topology from the SDN controller;
        calculating a dynamic metric which is CBR (Consumed Bandwidth Rate) of each link by collecting port statistics of the OF;
        acquiring a minimum cross set of the static metric and the dynamic metric; and
        selecting the Honey Node Set through the minimum cross set.

* * * * *